Dec. 22, 1953     R. C. BELGAU     2,663,472
CARGO CARRIER FOR MOTOR VEHICLES
Filed Sept. 11, 1950
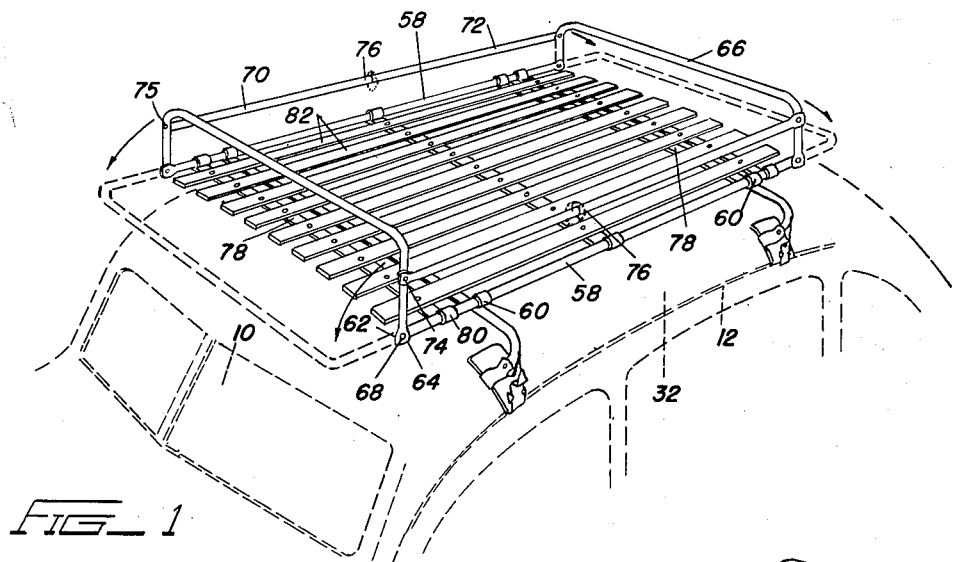
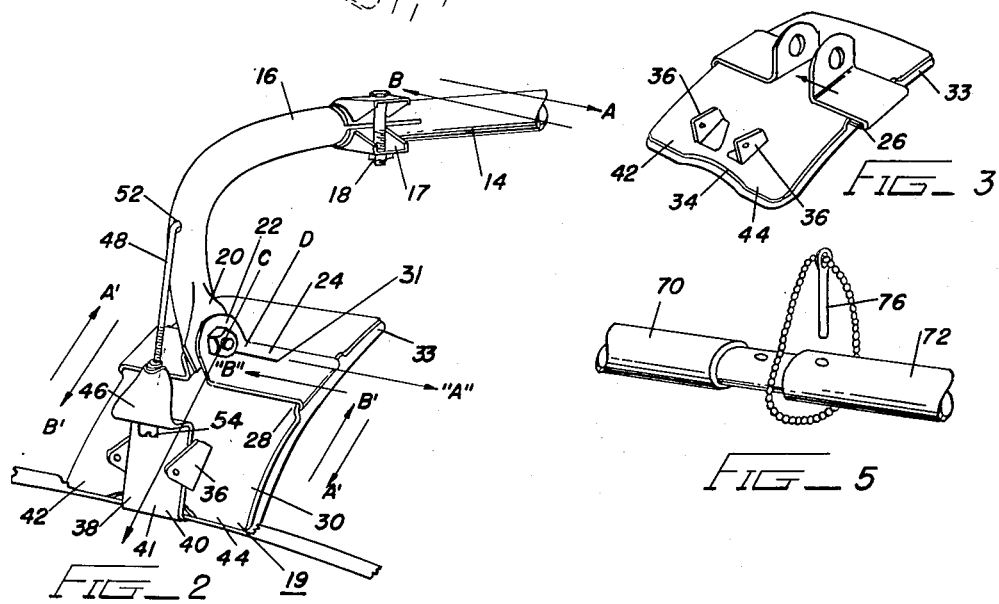
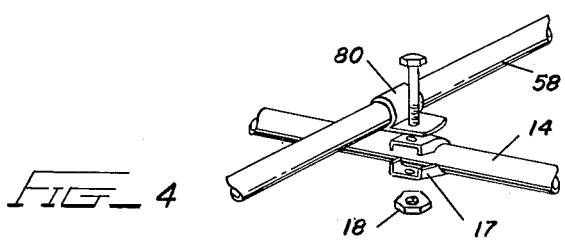
INVENTOR.
ROBERT C. BELGAU
BY
ATTORNEY Patented Dec. 22, 1953

2,663,472

UNITED STATES PATENT OFFICE 2,663,472

CARGO CARRIER FOR MOTOR VEHICLES

Robert C. Belgau, Detroit, Mich.

Application September 11, 1950, Serial No. 184,205

3 Claims. (Cl. 224—42.1)

This invention relates to cargo carriers for automobiles, and more particularly to an improved carrier adapted to be secured to a vehicle top in such a manner that the weight of the load tends to more securely clamp the carrier to the vehicle.

Vehicle-top carriers heretofore used, support the cargo on the substantially flat top surface of the vehicle. Difficulties have been encountered with these types of carriers because the substantially flat portion of the vehicle top is unsupported for cargo and being relatively weak is subjected to an undesirable degree of distortion.

An object of this invention is therefore to provide an improved carrier adapted to be detachably fitted and anchored to the rounded shoulder portions of the vehicle-top thereby insuring balanced distribution of the load over the strongest portion of the vehicle-top.

A further object of this invention resides in the provision of an improved carrier having longitudinally spaced pairs of load supporting saddles adapted to engage the rounded shoulders of the vehicle body, and be secured in place by clamps engaging the eaves extending longitudinally of the vehicle body.

Another object is to provide an improved carrier having flexible load supporting saddles adapted to yield and conform to the contour of the vehicle body shoulders, and wherein resilient material is interposed between the saddles and the vehicle body to prevent marring the surface finish of the vehicle.

Yet a further object of the invention is to provide a load supporting member, or saddle, adapted to clamp to the shoulder of a vehicle body in such a manner that a three point mounting is insured.

Another object is to provide a cargo carrier so proportioned that it can be adjusted to fit all standard-sized hard-top vehicles, and which may be quickly and easily installed or removed from the vehicle.

Still another object of this invention resides in the provision of an improved carrier wherein the load applied to the carrier exerts a force thereon to more securely clamp the carrier to the vehicle.

Other objects and advantages of this invention will appear from the following description and appended claims, reference being had to the accompanying drawings which form a part of this specification, and in which:

Fig. 1 is a perspective view illustrating my improved carrier applied to a motor vehicle.

Fig. 2 is an enlarged perspective view illustrating the load carrying saddles.

Fig. 3 is a perspective view illustrating a detail of the construction of the load carrying saddles.

Fig. 4 is a separated view illustrating one of the fastening devices.

Fig. 5 is a fragmentary perspective view illustrating another of the fastening devices.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings it will be observed that my improved cargo carrier is illustrated as applied to the body 10 of a motor vehicle having an eave 12 extending longitudinally thereof above the door openings of the vehicle.

My improved carrier consists of a plurality of longitudinally spaced cross bars 14 extending transversely of the vehicle body. Each cross-bar is adapted to receive at its opposite ends a contoured bar or leg 16 in telescoping relation therewith. The cross-bar and leg members are adapted to be securely locked together by spaced clamps 17 having bolt and nut fastening members 18. Each of the spaced legs 16 is provided with a load supporting member or saddle 19.

Each leg 16 has a flattened and drilled end-section 20 adapted to project between upturned flanges 22 of oppositely disposed saddle brackets 24 having reversely bent sections 26 adapted to project into and engage contoured portions 28 of saddle plates 30 and to be secured thereto by any suitable fastening means such as a bolt and nut combination 31.

The saddle plates 30 are contoured to conform with the rounded shoulder portions 32 of the vehicle body. A resilient material such as a felt or rubber sole 33 may be secured to the vehicle contacting surface of the saddle-plates 30 to prevent marring the surface of the vehicle.

The lower central portion of the saddle-plate 30 is provided with a cross-channel as illustrated at 34 and a pair of spaced guides 36 formed integrally with the saddle plate 30 to receive an eave-hook 38 designed to hook over and around the lower surfaces of the eave 12 of the vehicle body. The vehicle contacting portion of the hook 38 is provided with a resilient covering 40 such for example as plastic to prevent marring the surface of the vehicle and to prevent the hook from slipping on the vehicle body.

A pair of spaced eave-contacting sections 42 and 44 are provided on each saddle plate 30 with the relieved central section or channel 34 interposed therebetween. The eave-hook 38 is adapted to be secured to the leg 16 in such a manner that when a load is applied to the cross bars 14 to deflect them downwardly, a thrust will be applied through the leg 16 to tighten the grip of the eave-hook 38 on the eave 12. The eave-hook 38 is provided with a contoured section 46 adapted to receive an anchor rod 48 in telescoping relation through an aperture in the contoured section 46. The upper end of the anchor rod 48 is bent to provide a hook projecting into an aperture 52 in the legt 16 to securely clamp the upper end of the anchor rod to the leg. The lower end of the anchor rod 48 projects through the contoured section 46 and is engaged by a nut 54 whereby the hook 38 may be tightened with reference to the eave 12.

In the application of this portion of my improved carrier to a vehicle the clamps 17 are loosened to permit telescoping action of the cross bar 14 and the spaced leg 16. The nut 31 is loosened to permit angular movement between the saddle plate 30 and its associated leg 16. The assembly thus formed is positioned on top the vehicle with the spaced sections 42 and 44 of the plate 30 projecting into the upper surface of the eave 12. The nut 54 is loosened to permit the hook 38 to overlie the bottom surface of the eave 12 between the guides 36 and the spaced sections 42 and 44 of the saddle plate 30.

Another similar assembly is positioned on top of the vehicle in longitudinally spaced relation to the first mentioned assembly and is adjusted in a manner similar to that described. The cross bars 14 of both assemblies are levelled with reference to each other, and the assemblies are shifted forwardly or backwardly relative to each other to bring them in substantial alignment vertically. The clamps 17 and the nuts 31 and 54 are then tightened to securely clamp the cross-bars 14 to their associated leg members, to securely clamp the leg-members to their associated saddle-brackets 24 and to clamp the eave hooks 38 to the under-surfaces of the eaves 12 with the sections 42 and 44 of the saddles firmly contacting the upper surface of the eave.

It will be noted that a three point suspension is provided at 42—38—44. In Fig. 2 the arrows A and B indicate thrust loads when stopping and starting the vehicle respectively, that is braking and acceleration loads. Arrows A' and B' indicate the corresponding reactionary lines of force exerted on the saddles 19 which tend to tighten the anchorage of the saddles to the eaves 12. The lines C indicate the three points of contact which influence the reactionary lines because the point of load-force contact D with the saddle is above and spaced inwardly relative to the vehicle top or spaced away from the eaves 12. The wider the saddle and the higher the load-contact D within the limits of the curved shoulder portions 32 of the vehicle the greater the reactionary forces A' and B' become with respect to a given load force because the three-point-contact C is wider apart and D being higher, the thrust-leverage is increased.

Reduction of saddle width and lowering of D reduces the anchorage effect, in relation to given thrust lines, A or B.

If only one bar assembly were employed the tendency of thrust lines A or B and reactionary lines A' and B' would be to lay the bar over—forward or back—on the car-top. Since at least two bar assemblies are employed, and these bars are secured together, either by a load clamped thereto or by a carrier structure the thrust lines A and B on the cross-bars tend to bend or spring the cross-bars in a forward and backward direction. These reactionary lines of force not indicated combined with reactionary forces A' and B' tend to further tighten the saddle plates 30 in a pinching manner.

It is desirable that any device intended to carry cargo on top of a vehicle should be so designed that the cargo thrust is transmitted directly to the vehicular body thence to its springs. In this manner the vehicle and top cargo behave as a single mass and the top cargo exerts a minimum adverse influence on the vehicular inertia and control. Clamped firmly to the eaves and snugly resting on the curved shoulders, there is no free motion between the carrier assembly or vehicle body and the load, except for the bending action of the cross-bars—up and down—forward and backward—as the load thrust is applied. This bending action is controlled by the strength and stiffness of the cross-bars according to the load factor they are designed to carry.

It will be apparent that when a braking force is applied to the vehicle, the load supported on the carrier tends to continue to travel. A wedging action or couple is thus exerted between the points 38 and 44 which securely holds the load on the vehicle top. When the vehicle accelerates a wedging action or couple is exerted between its points 38 and 42 which also securely holds the load on the vehicle top.

Attention is directed to the fact that the saddle or load supporting members 30 must have sufficient resistance that they will not readily loose their shape. Spring steel or other suitable material having a desirable degree of spring-back is therefore suitable.

Any suitable tensioning device may be employed in view of the anchor rod 48. For example a turnbuckle between the eave hook 38 and the leg 16 may be employed to clamp the sections 42 and 44 of the saddle 30 and the hook 38 to the eaves 12 of the vehicle.

An suitable load supporting means may be secured to the cross bars 14 dependent on the type of load which it is desired to carry. One illustrative example of load supporting means is illustrated in Fig. 1 and consists of a pair of longitudinally extending lower side-rails 58 having anchor clamps 60 surrounding the rails as illustrated and adapted to be secured to the cross-bars 14 as more clearly illustrated in Fig. 4.

The ends of the side-rails 58 are flattened as illustrated at 62 to receive the flattened ends 64 of U-shaped end members 66 adapted to be secured thereto by bolts 68 for pivotal movement thereon. Upper side-members having telescoping sections 70 and 72 have flattened end sections 74 adapted to be clamped by bolts 75 to the U-shaped end members 66 at a point spaced from the bolts 68 connecting the U-shaped members 66 to the lower side rails 58.

Any suitable means may be employed to secure the telescoping members 70 and 72 together, such for example as a cotter pin 76 illustrated in Fig. 5. When the side rail members are in the elevated position with the pin 76 in place as illustrated in full lines, a rack is provided which will prevent articles therein from falling off of the top of the vehicle. When it is desired to carry articles longer than the space between the end members 66 the pins 76 may be withdrawn from the upper telescoping members 70 and 72 and the bolts 68 loosened to permit pivotal movement of the U-shaped members 66 about the bolts 76 to the horizontal position illustrated in dotted lines in Fig. 1. The telescoping members 70 and 72 of the upper side rails contact the legs 16 secured to the cross bar 14 to limit outward movement of the U-shaped members 66. The cotter pin 76 may then be positioned in aligned holes in the members 70 and 72 and the bolts 68 and 75 tightened to securely hold the assembly in the position illustrated in dotted lines.

It will of course be apparent that cross members 78 may be secured to the side rails 58 by suitable clamps 80, and that a plurality of longitudinally extending slats 82 may be secured to the cross members 78 to provide a suitable support for articles to be carried.

It will of course be apparent that it is possible to carry many types of loads directly on the cross bar members, and that any suitable rack or other supporting members may be suitably secured to the cross bars 14. For example small boats may be supported on and secured to a pair of cross bars 14, and to carry small articles it is of course desirable that a solid platform be employed rather than the spaced slats 82 illustrated in Fig. 1.

I claim:

1. In a cargo carrier for a vehicle having rounded top shoulders and longitudinally extending eaves, a plurality of pairs of contoured generally rectangular shaped saddle plates adapted to engage the shoulders of the vehicle and having spaced eave contacting sections, each saddle plate having a pair of oppositely disposed saddle brackets slidably mounted transversely thereon and having upturned substantially parallel flanges, a contoured bar having a flattened apertured end adapted to project between said upturned flanges, means to clamp the contoured bar to the upturned flanges of the saddle brackets, an eave hook adapted to engage the undersurface of the eave, a pair of guides adapted to maintain the eave hook substantially midway between the eave contacting sections of the saddle plate, an adjustable anchor rod interposed between the eave hook and the contoured bar, and cross bars adapted to interconnect each pair of saddle plates.

2. A cargo carrier for a vehicle having rounded top shoulders and longitudinally extending eaves comprising a pair of longitudinally spaced cross bars, a contoured bar at each end of each of said spaced cross bars, a saddle plate associated with the free end of each of said contoured bars and adapted to engage the shoulders of the vehicle and having spaced eave contacting sections, each saddle plate having a pair of oppositely disposed saddle brackets slidably mounted thereon and having substantially parallel upstanding flanges, means to clamp the free end of each contoured bar to the upturned flanges of the saddle brackets of its associated saddle plate, an eave hook adapted to engage the eave between the eave contacting sections of the saddle plate, a pair of guides adapted to maintain the eave hook between the eave contacting sections of the saddle plate, and an adjustable anchor rod interposed between the eave hook and the contoured bar.

3. In a cargo carrier for a vehicle having rounded top shoulders and longitudinally extending eaves, a contoured generally rectangular shaped saddle plate adapted to engage the shoulders of the vehicle and having spaced eave contacting sections, a pair of oppositely disposed hook-like saddle brackets slidably mounted transversely on the saddle plate and having upturned flanges, a contoured bar having a flattened apertured end adapted to be secured to a framework of a cargo carrier, an eave hook associated with the saddle plate, guide means to maintain the eave hook in a substantially predetermined relation relating to the saddle plate, and an anchor rod adapted to engage one end of the eave hook.

ROBERT C. BELGAU.

References Cited in the file of this patent

UNITED STATES PATENTS

| Number | Name | Date |
|---|---|---|
| 1,894,083 | Chaney | Jan. 10, 1933 |
| 2,357,203 | Jimmes | Aug. 29, 1944 |
| 2,387,779 | Strauss | Oct. 30, 1945 |
| 2,436,228 | Purchase | Feb. 17, 1948 |
| 2,506,421 | Hacker et al. | May 2, 1950 |
| 2,613,020 | Berry | Oct. 7, 1952 |

FOREIGN PATENTS

| Number | Country | Date |
|---|---|---|
| 776,636 | France | Nov. 8, 1934 |
| 833,749 | France | July 25, 1938 |
| 49,274 | France | Nov. 12, 1938 |
| | (Addition to No. 835,488) | |
| 866,287 | France | Apr. 21, 1941 |